Aug. 22, 1961 J. ROEDER, JR 2,997,514
REFRIGERATING APPARATUS
Filed March 11, 1958 4 Sheets-Sheet 1
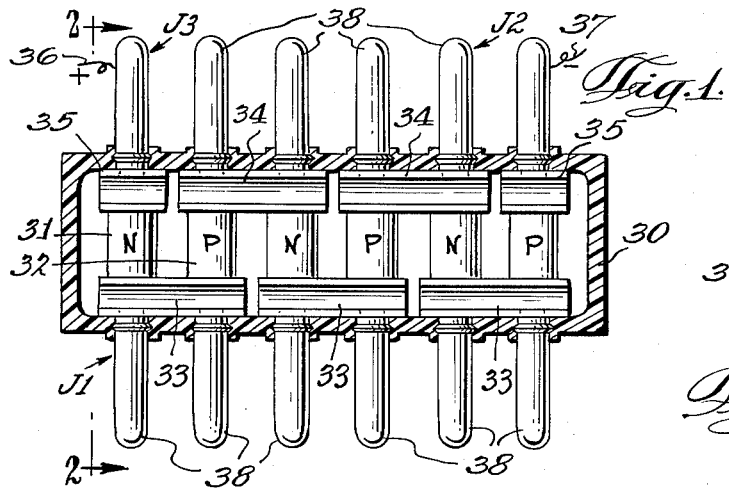
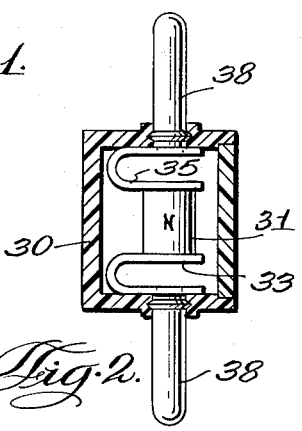
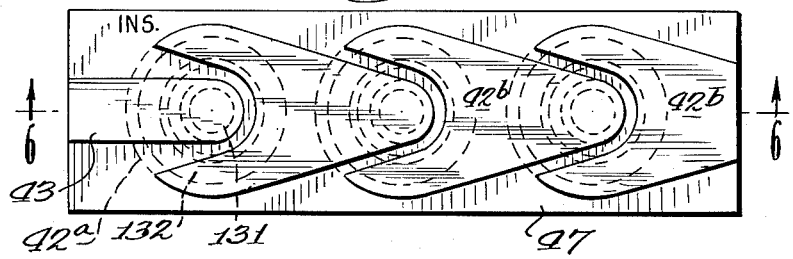
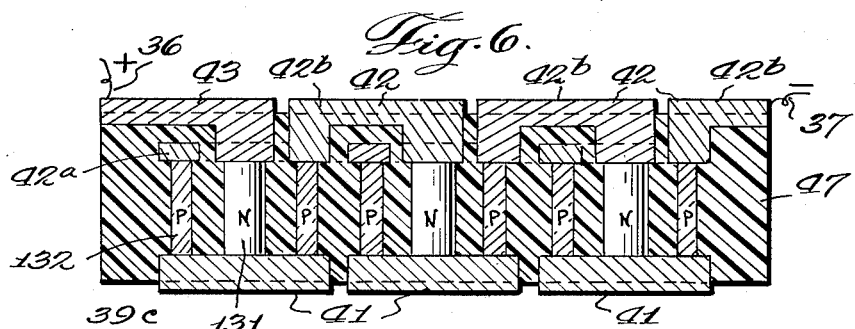
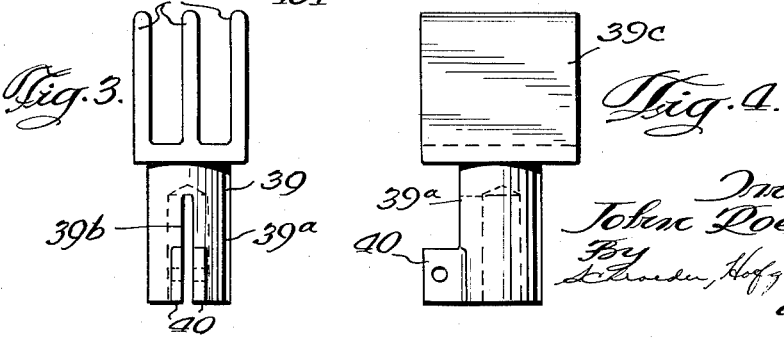
Inventor
John Roeder Jr.
By Roeder, Hofgren, Brady & Wegner
Attorneys Aug. 22, 1961
J. ROEDER, JR
2,997,514
REFRIGERATING APPARATUS
Filed March 11, 1958
4 Sheets-Sheet 2
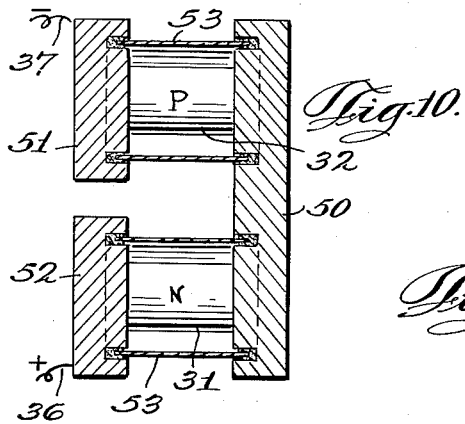
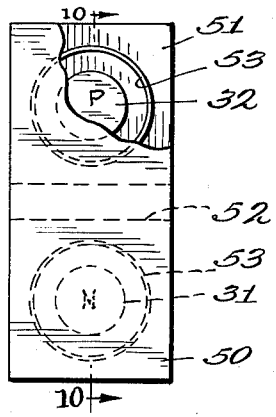
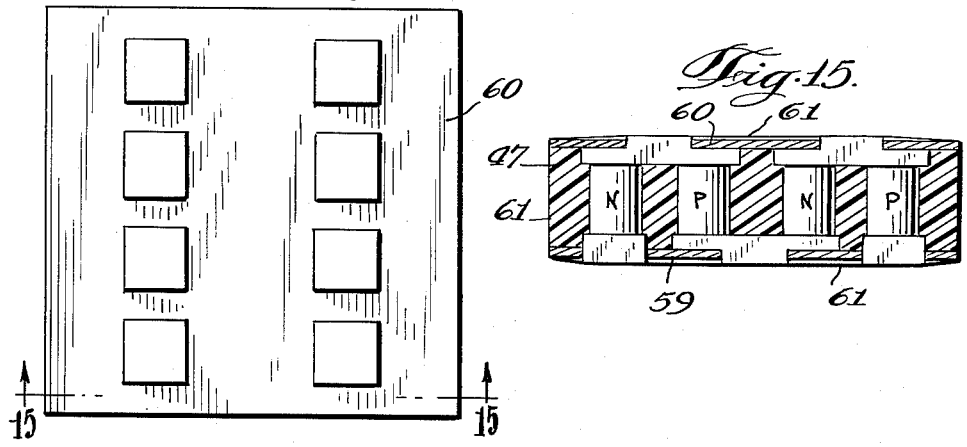
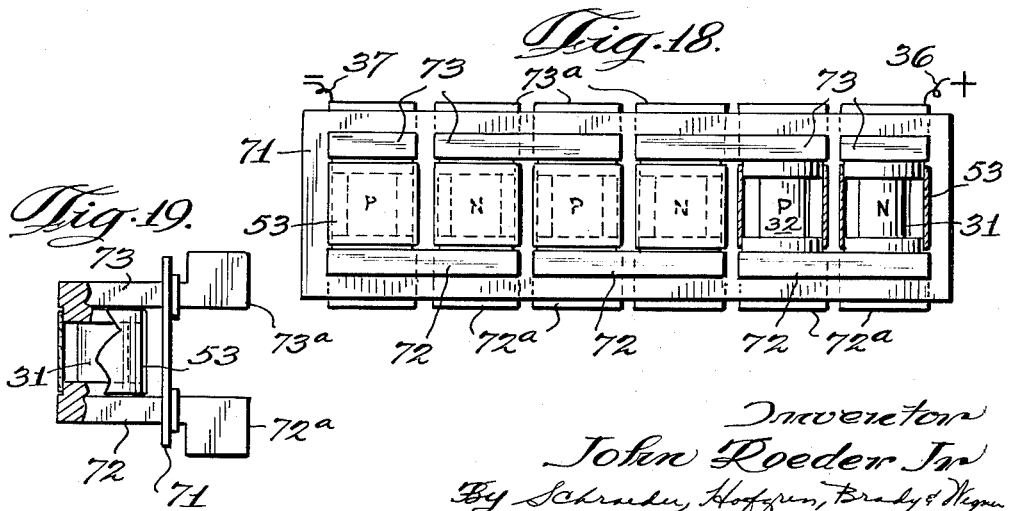
Inventor
John Roeder Jr
By Schroeder, Hofgren, Brady & Wegner
Attorneys

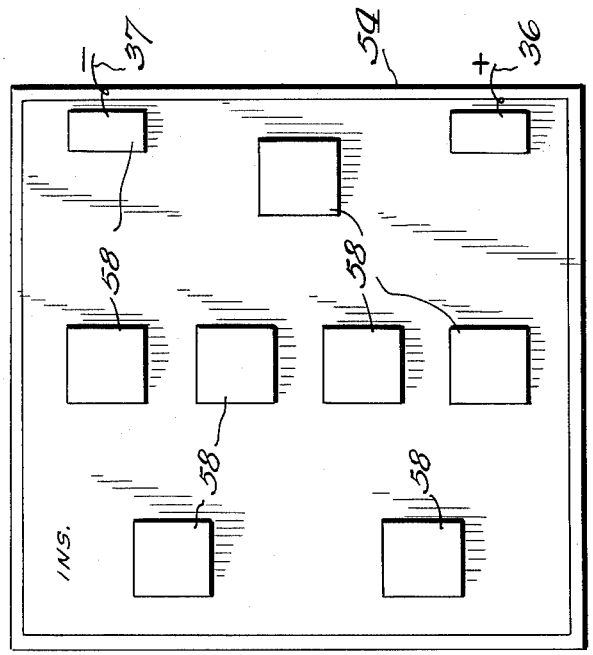
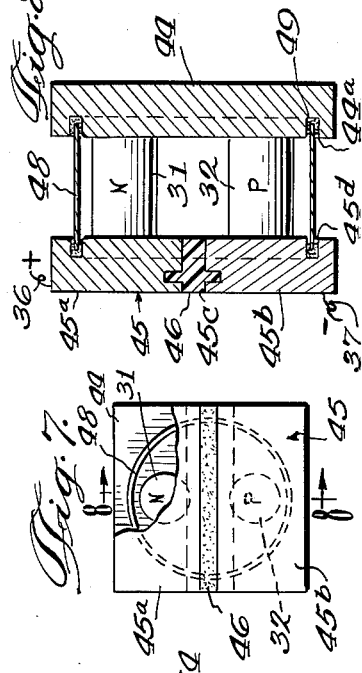
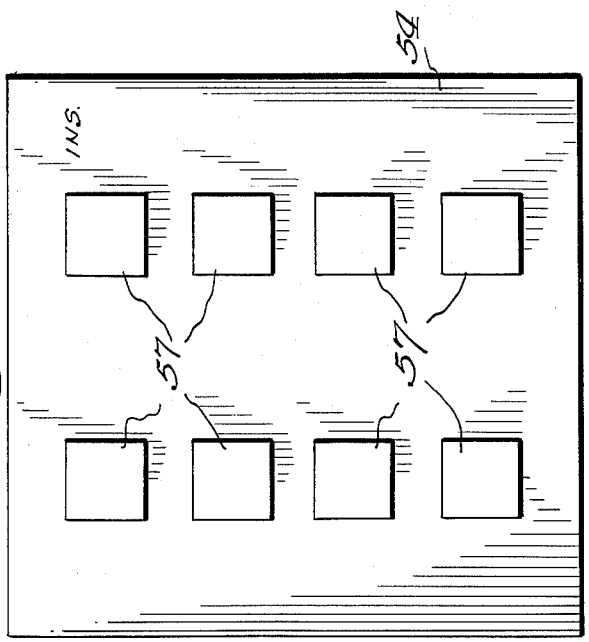

Aug. 22, 1961   J. ROEDER, JR   2,997,514
REFRIGERATING APPARATUS
Filed March 11, 1958   4 Sheets-Sheet 4
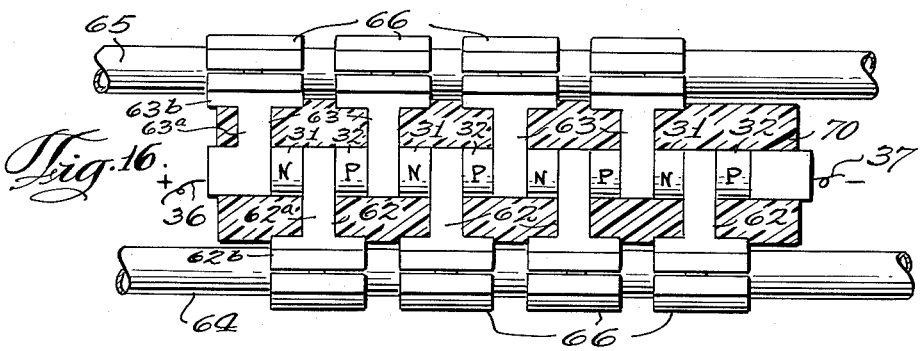
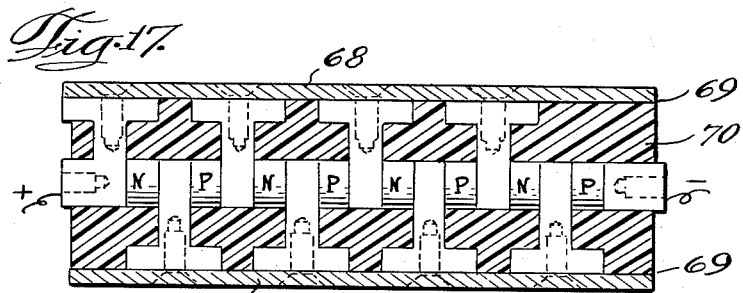
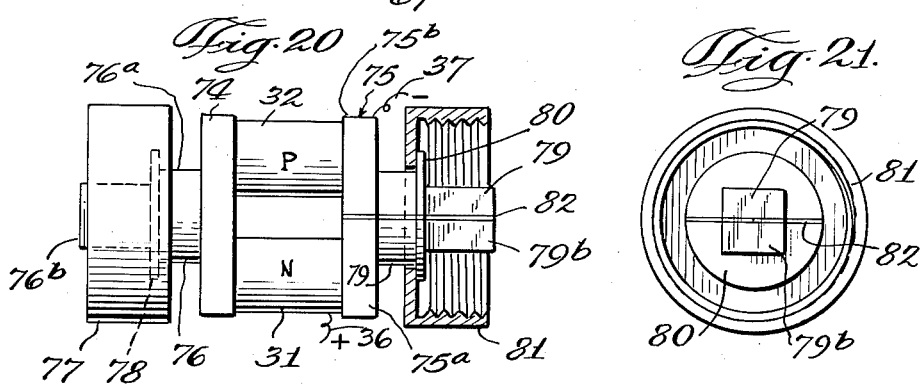
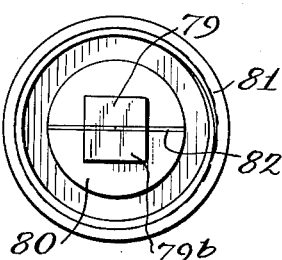
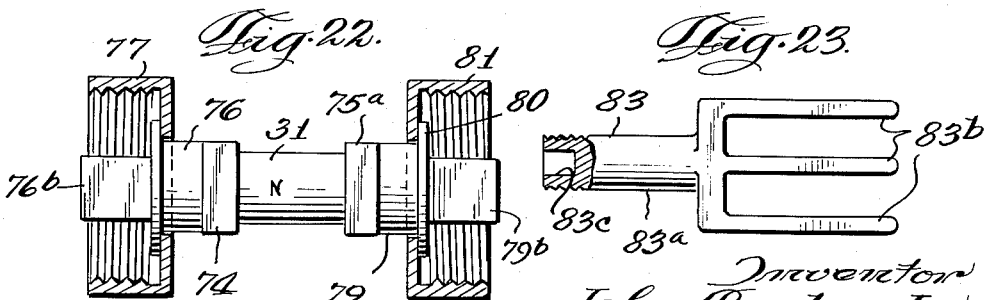
Inventor
John Roeder Jr.
By Schrader, Hoffren, Brady & Wegner
Attorneys

United States Patent Office 2,997,514
Patented Aug. 22, 1961

2,997,514
REFRIGERATING APPARATUS
John Roeder, Jr., Benton Harbor, Mich., assignor to Whirlpool Corporation, a corporation of Delaware
Filed Mar. 11, 1958, Ser. No. 720,590
7 Claims. (Cl. 136—4)

This invention relates to a refrigerating apparatus in the nature of a thermocouple panel particularly adapted for thermoelectric heating and cooling.

In thermoelectric cooling, one or more pairs of thermoelectric elements are arranged in electrical series and are subjected to a thermoelectric current. At one of the junctions of the thermocouple, a cooling effect is achieved; at the other, a heating effect is achieved. The elements of each thermocouple are ordinarily identified as N elements and P elements. The N elements are made of a material such as bismuth having an abundance of electrons. The P elements are of a material such as antimony having an abundance of electron vacancies.

It has been proposed in the past to arrange a plurality of thermocouples in a panel which includes the dissimilar elements and the hot and cold junctions on opposite sides of the panel. One of the difficulties in producing such a panel that will operate efficiently for long periods of time is to prevent rupture of the bond uniting a surface of the element in the thermocouple to the hot or cold junction. This joint is often fragile and even when successfully made often has a relative short life. The thermoelectric panels of this invention either avoid completely or materially reduce these disadvantages. In addition, the panels of this invention are quite sturdy and inexpensive and are compact so that they may be readily installed in a series of manufactured units or on the production line and may also be easily replaced when required.

One feature of the invention is to provide an improved thermocouple structure comprising a thermoelectric element, a pair of electrically conducting members on spaced sides of the element in conducting relationship therewith, and a substantially air impervious protective member surrounding said element and the portions of the electrically conducting members in the areas of said spaced sides, the protective member being spaced from said element and containing means providing a substantially non-oxidizing environment.

Another feature is to provide an improved thermocouple structure comprising a pair of dissimilar thermoelectric elements with one surrounding the other, and means electrically connecting said elements in series to provide a hot junction on one side and a cold junction on the other side when the elements are subjected to a thermoelectric current.

A further feature is to provide an improved thermocouple structure comprising a pair of dissimilar thermoelectric elements, and a thermal and electrical conducting metal junction between said elements and in contact with both, the junction including an outwardly extending heat conducting portion.

Yet another feature is to provide an improved thermocouple structure comprising a pair of dissimilar thermoelectric elements, means electrically connecting said elements in series to provide a hot junction on one side and a cold junction on the other side when the elements are subjected to a thermoelectric current, said junctions including a continuous metal member in contact with said pair and two spaced apart but substantially aligned and closely adjacent metal members each in contact with one of the elements of said pair, means on said continuous metal member for releasably holding a heat conducting member, and means bridging said spaced apart members for releasably holding a heat conducting member, said bridging means including a dielectric portion substantially electrically isolating the spaced apart members.

Other features and advantages of the invention will be apparent from the following description of certain embodiments thereof taken in conjunction with the accompanying drawings. Of the drawings:

FIGURE 1 is a sectional elevational view showing the interior of a panel embodying the invention.

FIGURE 2 is a sectional elevational view taken substantially along line 2—2 of FIGURE 1.

FIGURE 3 is an end elevational view of a removable heat dissipator which may be attached to a hot junction of the embodiment of FIGURES 1 and 2 for dissipating heat into the surrounding atmosphere.

FIGURE 4 is a side elevational view of the dissipator.

FIGURE 5 is a plan view illustrating a second embodiment of the invention.

FIGURE 6 is a sectional elevation taken substantially along line 6—6 of FIGURE 5.

FIGURE 7 is a plan view, partially broken away for clarity of illustration, of a third embodiment of the invention.

FIGURE 8 is a sectional elevation taken substantially along the line 8—8 of FIGURE 7.

FIGURE 9 is a plan view, also partially broken away, of a fourth embodiment of the invention.

FIGURE 10 is a sectional elevation taken substantially along the line 10—10 of FIGURE 9.

FIGURE 11 is a sectional elevation illustrating a fifth embodiment of the invention.

FIGURE 12 is a plan view of the embodiment of FIGURE 11.

FIGURE 13 is a bottom view thereof.

FIGURE 14 is a plan view of a sixth embodiment of the invention.

FIGURE 15 is a sectional elevation taken substantially along the line 15—15 of FIGURE 14.

FIGURE 16 is a side elevational view of a seventh embodiment of the invention.

FIGURE 17 is similar to FIGURE 16, but showing an eighth embodiment.

FIGURE 18 is a side elevational view showing a ninth embodiment of the invention.

FIGURE 19 is an end elevational view of the embodiment of FIGURE 18, with portions broken away for clarity of illustration.

FIGURE 20 is a side elevational view, partially broken away, of a tenth embodiment of the invention.

FIGURE 21 is an end elevational view of the embodiment of FIGURE 20.

FIGURE 22 is a side elevational view thereof.

FIGURE 23 is a reduced side elevational view of a detachable heat dissipator for use with the embodiment of FIGURES 20–22.

In the embodiments of FIGURES 1 to 4 inclusive there is provided an air tight hollow container 30 which is preferably made of a rigid plastic material such as a phenol-formaldehyde resin, a fiberglass filled polystyrene or the like.

Within the container 30 there is located a plurality of thermocouples each made up of a pair of dissimilar thermoelectric elements 31 and 32 marked N and P. Each pair of N and P elements 31 and 32 are connected by metal junctions J1 and J2 including inner portions 33 and 34 respectively. All of the junctions J1 are arranged on one side of the container and adjacent to one inner surface thereof and all of the other junctions J2 are arranged on the opposite side. As can be seen in FIGURE 1, the junctions J1 and J2 in combination with end junctions J3 on the first N element and the last P element arrange all elements and the junctions in electrical series. Then when a thermoelectric current is passed through this series as indicated diagrammatically by the electric leads 36 and 37, the junctions J1 become the cold junctions while junctions J2 are the hot junctions.

Attached to each of the junction portions 33 and 34 are a pair of outwardly extending shafts 38. A single shaft 38 only is attached to the inner portion of each end junction 35. These shafts are used to convey heat into the cold junctions J1 and to convey heat outwardly from the hot junctions J2. In order to aid this heat transfer, any of various types of devices may be used. One such is shown in FIGURES 3 and 4. Here is shown a heat dissipator 39 which may be attached to the shaft of a hot junction J2 in order to dissipate heat into the surrounding environment such as into the surrounding atmosphere. The dissipator 39 includes a hollow split base 39a adapted to receive a shaft 38 and to be tightened securely thereon by means of a bolt (not shown) passing through spaced perforated ears 40 located on opposite sides of the split 39b. Attached to the base 39a are three spaced, substantially parallel, outwardly extending fins 39c. The dissipator 39 may also be used as a heat absorber.

As shown in FIGURE 2 each of the junction portions 33, 34 and 35 are generally U-shaped with one leg of the U attached to an end of an element 31 or 32 and the other leg of the U attached to a shaft 38. As shown, the two legs are substantially parallel to each other.

The electrical and heat conducting parts of the assembly which include the junction portions 33, 34 and 35 and the shafts 38 are made of a heat conducting metal such as copper or aluminum. The parts are soldered together in order to make a rigid assembly. The container 30 which is rectangular in cross section gives rigidity to the structure and protects the soldered or otherwise joined interfaces between the elements 31 and 32 and the respective junction portions 34 and 35. In addition, the container may be evacuated of air or otherwise provided with a non-oxidizing internal atmosphere. Thus, if desired, the interior of the container may have an inert gas such as nitrogen thereby materially reducing oxidation of the interfaces so as to extend the effective life of the unit.

In the embodiment shown in FIGURES 5 and 6 each N element 131 is positioned substantially concentrically within a surrounding cylindrical P element 132. Attached to each pair of N and P elements is a junction 41 on one side of the panel. On the opposite side joining a P element of a couple to the N element of the adjacent couple is a junction 42. In the embodiment shown, with the electric leads as indicated at 36 and 37, the junctions 41 are cold while the junctions 42 are hot. Each of the junctions 41 is an essentially flat plate. Each junction 42 is made up of an annular section 42a attached to one end of a cylindrical P element and a generally triangular section 42b spaced upwardly and extending forwardly thereof and including a downwardly extending portion joined to the next succeeding N element. The first junction 43 that is in contact with the first N element in the series is not necessarily generally triangular, but may be substantially rectangular as illustrated in FIGURE 5. The elements 131 and 132 and the adjacent portions of the junctions 41, 42 and 43 are held in a block of rigid thermal and electrical insulating material 47.

The thermal and electrical insulating material may be any of the well known plastics, preferably a foamed plastic that is substantially rigid and that preferably is foamed in place. Among the foamed plastics that may be used are foamed polystyrene, foamed polyurethane and the like. Because of its excellent physical properties and because it may be foamed in place to adhere firmly to the surfaces which it contacts to produce a rigid block, a foamed, rigid polyurethane is preferred. These are well known and widely used materials and are easily produced.

In general the foamed, rigid polyurethanes are produced by reacting an organic diisocyanate such as toluene 2,4-diisocyanate with a polyester of a dibasic acid and a trihydric alcohol in which the ester contains free hydroxy and carboxylic groups with the reaction taking place in the presence of water. Methods of producing such rigid polyurethane foams are disclosed, for example, in U.S. Patent No. 2,577,281 with Example 17 showing an excellent method of preparing such a rigid foam.

In a method disclosed in the above patent an alkyd resin is first produced as by reacting 4 mols of glycerol and 2.5 mols of adipic acid in the presence of 0.5 mol of phthalic anhydride. This resin is the polyester. This resin is then reacted with the diisocyanate and preferably water as the foaming agent, also preferably in the presence of a non-ionic wetting agent to promote more uniform cell formation. A catalyst such as benzoyl peroxide is also preferably included and if desired a flame retarding agent such as is disclosed in the patent.

In the third embodiment, FIGURES 7 and 8, the thermocouple panel includes only one pair of elements, an N element 31 and a P element 32. These elements extend between metal strips 44 and 45 that are preferably of copper and the elements are attached to these strips as by soldering. The metal strip 45 is divided into two parts, 45a and 45b, by a cross cut 45c forming a joint located substantially midway between the elements 31 and 32. This joint 45c is sealed with a plastic material 46 which may be a soft polystyrene adhered to the surfaces forming the joint. Such sealing materials are well known to those skilled in the art.

In order to protect the elements 31 and 32 particularly at the interfaces where they are attached to the metal strips 44 and 45 there is provided a cylindrical barrier 48 of glass, transparent plastic or the like. The edges of the shield or barrier 48 extend into circular grooves 44a and 45d containing a sealing material which may be similar to the sealing material 46. The interior of the barrier 48 is then preferably evacuated of air or provided with some similar non-oxidizing atmosphere in the manner previously described.

In order to give added strength and reduce the weight the metal strips 44 and 45 may be of aluminum plated with copper if desired. The sealing compounds 46 and 49 may be of any material desired. Thus the compound 46 may be a solid phenol formaldehyde or polyester, while the compound 49 in the grooves 44a and 45d may be any of the ordinary potting compounds.

The fourth embodiment of the invention shown in FIGURES 9 and 10 is somewhat similar to the previously described embodiment. Here the junction 50 is a continuous metal strip, but the junctions 51 and 52 are completely separate from each other. In this embodiment each element 31 and 32 is surrounded with its own protective member 53 sealed at the ends to the respective metal strips in the manner previously described. In this embodiment, as in the previous embodiments, with the electric leads 36 and 37 connected as diagrammatically indicated the continuous strip 50 is the cold junction while the opposite strips 51 and 52 are the hot junctions.

The fifth embodiment of the invention is shown in FIGURES 11, 12 and 13. Here there is provided a container 54 similar to the container 30 of the embodiment of FIGURE 1 except that container 54 is generally square instead of elongated rectangular. Located within the interior of container 54 are eight thermocouples each made up of a pair of N and P elements 31 and 32. Each thermocouple is connected in electrical series by means of junctions 55 and 56. Each junction is a metal bar on the interior of container 54 extending between a pair of dissimilar elements and each junction has integral therewith an outwardly extending heat transfer member 57 and 58. A member 57 forms a part of a junction 55 and a member 58 forms a part of a junction 56. The junctions 55 and corresponding members 57 are located on one side of the container 54 while the junctions 56 and corresponding members 58 are located on the other side. With this arrangement, all of the junctions and all of the elements are arranged in electrical series so that when this series is subjected to a thermoelectric current as indicated diagrammatically by the leads 36 and 37 the junctions 55 and elements 57 are cold while the junctions 56 and corresponding elements 58 are hot. Each member 57 and 58 is essentially square and is of substantial size and mass.

The sixth embodiment of the invention as shown in FIGURES 14 and 15 is similar to the embodiment shown in FIGURES 11, 12 and 13. Instead of the container 54, however, a pair of substantially parallel plates 59 and 60 is employed with foamed in place insulation therebetween. These plates are preferably of a synthetic plastic such as rigid phenol-formaldehyde resin as is the container 54. The assembly of plates, elements and junctions is contained within a tightly drawn bag 61 that is substantially air impervious. This bag may be of any material desired, but is preferably Mylar. As can be seen in FIGURE 15, the bag extends over the entire unit or panel and may be evacuated of air or filled with a non-oxidizing gas as desired. With this arrangement not only is the interior of the panel protected from oxidizing conditions, but the entire panel is isolated electrically as the bag extends over the exposed portions of the junctions. The electric leads (not shown) may extend through small openings in the bag which are sealed by means of a cement or the like.

In the seventh embodiment of the invention as shown in FIGURE 16, two sets of junctions 62 and 63 are provided. The dissimilar thermoelectric elements 31 and 32 are substantially linearly aligned and each junction includes a stem portion 62a and 63a and a heat transfer portion 62b and 63b. Each of the stem portions 62a and 63a extend between a dissimilar pair of elements 31 and 32. All of the junctions 62 are arranged on one side of the panel and all of the junctions 63 are arranged on the other. In the embodiment of FIGURE 16 with the electric circuit as indicated at 36 and 37 the junctions 62 are cold junctions while the junctions 63 are the hot junctions.

In the embodiment of FIGURE 16, each junction is of approximate T-shape with the heat transfer portions 62b and 63b being elongated and of arcuate cross section to partially embrace a conduit or pipe 64 and 65. These portions are held in close heat conducting relationship to the respective pipe by means of arcuate clamp members 66, but are electrically insulated therefrom by a suitable film such as Mylar. Thus the clamp members 66 cooperate with the respective heat transfer portions 62b and 63b to embrace closely a pipe.

The pipes or tube 64 and 65 are used to convey heat to and from the thermoelectric panel. Thus if desired, the tube 64 that contacts the cold junctions 62 may contain Freon and extend into the food compartment of a refrigerator. With this arrangement the cold junctions serve to pump heat from the interior of the food compartment to the thermoelectric panel. Similarly the pipe or tube 65 may also contain Freon and may extend to the exterior of the refrigerator to pump heat from the thermocouple panel to the exterior atmosphere. A structure of this type is shown and described in my co-pending application, Serial No. 716,795, filed February 21, 1958, now Patent No. 2,947,150.

The eighth embodiment of the invention shown in FIGURE 17 is quite similar to the embodiment of FIGURE 16. Here, however, instead of the pipes 64 and 65, flat metal plates 67 and 68 are used to convey heat to and from the panel. Each plate 67 and 68 is electrically insulated from its corresponding junctions by means of a thin sheet of insulating material 69. This may be of any material desired, preferably a synthetic plastic such as Mylar.

In each embodiment shown in FIGURES 16 and 17, all but the outer ends of the heat transfer portions 62b and 63b are enclosed in a rigid block 70 of thermal and electrical insulation material. This may be a foamed in place polyurethane of the type previously described.

In the ninth embodiment of the invention shown in FIGURES 18 and 19 there is provided a rigid electrical insulating plate 71 which may be a phenolic resin such as a rigid phenol-formaldehyde resin. Extending through this plate 71 are two spaced parallel sets of metal junctions 72 and 73. Attached to the junctions 72 and 73 are pairs of dissimilar N and P elements 31 and 32. The junctions and elements are arranged in electrical series so that when this series is connected to a thermoelectric current as indicated by the leads 36 and 37 the junctions 72 are the cold junctions while the hot junctions are those indicated as 73.

Positioned around each thermoelectric element and extending between the junctions 72 and 73 is a cylindrical barrier of the nature of the barrier 53 previously described in connection with the embodiment of FIGURES 9 and 10. On the side of the plate 71 opposite to the elements 31 and 32 and the barriers 53, the junctions 72 and 73 are extended and enlarged in thickness to provide heat transfer members 72a and 73a. These may be used in the manner previously described to transfer heat to the cold junctions and away from the hot junctions.

In order to provide an effective seal for all of the elements, it is preferred that the element side of the panel, that to the left of plate 71 as shown in FIGURE 19, be dipped in a suitable potting compound (not shown) of a conventional type.

In the tenth embodiment of the invention as shown in FIGURES 20-23 there is provided a pair of dissimilar elements 31 and 32 arranged substantially parallel to each other and having their ends attached to parallel metal strips 74 and 75 similar to the strips 44 and 45 of the embodiment of FIGURES 7 and 8. The strip 75 is divided between the junctions to form the two portions 75a and 75b. With electrical leads as indicated diagrammatically at 36 and 37, the strip 74 will be the cold junction while the portions 75a and 75b will be hot junctions.

Extending outwardly from the strip 74 is a stud 76 having a generally cylindrical inner end 76a and a square outer end 76b. Rotatable on the cylindrical end 76a is a cylindrical cup-shaped connector 77 that is threaded on its inner surface. The connector 77 is held on this cylindrical portion by means of an annular flange 78 at the outer end of the portion 76a.

A stud 79 similar to the stud 76 extends outwardly from the metal strip 75 at about the center thereof. The studs 76 and 79 are located essentially centrally of the unit, extend outwardly away from each other and are substantially linearly aligned. The stud 79 is provided with a flange 80 that is similar to the flange 78 and mounted on the cylindrical portion of the stud is an inner threaded cylindrical connector 81 that is similar to the opposite connector 77.

As stated above, the metal strip 75 is split at about its center to provide the portions 75a and 75b. This split, as indicated in FIGURE 20, extends longitudinally of the unit through the stud 79 and the joint resulting therefrom is filled with a sealing material 82 that may be similar to the material 46 previously described in the embodiment shown in FIGURES 7 and 8.

In order to convey heat to and from the junctions 74 and 75, dependent upon the direction of flow of the thermoelectric current, there is provided a pair of heat conducting members 83, one of which is shown at FIGURE 23. This member is somewhat similar to the heat dissipator 39 shown in FIGURES 3 and 4. Thus the member 83 includes a base 83a and three parallel fins 83b extending from one end of this base. The other end of the base is provided with a recess 83c of essentially square cross section adapted to receive either the square end 79b of stud 79 or the end 76b of stud 76. This end of the member 83 is threaded, as indicated, in order to be engaged by the internal threads of the connector 77 or the connector 81 in attaching the member to the unit. As each connector is rotatable on its respective stud, attaching and removing a heat conducting member is readily accomplished.

The connecting arrangement of the embodiment of FIGURES 21 and 23 permits tightening the member or members 83 on the respective studs without twisting the elements 31 and 32. In order to form a dielectric the outer ends 76b and 79b of the studs, the flanges 78 and 80 and the connectors 77 and 81 are aluminum anodized. The metal parts of the unit of this embodiment are made of electrical conducting metals such as copper or aluminum. It is preferred that the strips 74 and 75 be aluminum coated with copper in order to give strength to the structure.

As can be seen from the various embodiments of this invention the thermocouple panels may be made up of one pair of dissimilar thermoelectric elements or may be made of a series of pairs of elements. Furthermore, the panels may be used individually or a number of panels may be employed connected in series depending upon the cooling or heating effect desired. In each embodiment the panel is strong, compact and easily assembled into a desired structure. Furthermore, as each panel is a separate unit it may be easily removed and replaced when such is desired, as in servicing.

Having described my invention as related to the embodiments shown in the accompanying drawings, it is my intention that the invention be not limited by any of the details of description, unless otherwise specified, but rather be construed broadly within its spirit and scope as set out in the accompanying claims.

I claim:

1. A thermocouple structure comprising: an enclosure having spaced first and second wall portions; a pair of dissimilar thermoelectric elements within the enclosure each having a first portion adjacent said first wall portion and a second opposed portion; a junction connecting said first element portions including an electrically and thermally conductive spring member having resiliently connected spaced first and second portions, the first portion of the spring member conductively, conjointly engaging said first element portions and the second portion of the spring member engaging said first wall portion, said junction further including a heat transferring member extending from said second portion of the spring member through said first wall portion; and support means supporting said second element portions at said second wall portion.

2. The thermocouple structure of claim 1 wherein the spring member comprises a resilient, expandable metal member of generally U-shaped cross section.

3. The thermocouple structure of claim 1 wherein said support means comprises a pair of junctions, one junction of said pair including an electrically and thermally conductive second spring member having resiliently connected spaced first and second portions, the first portion of the second spring member conductively engaging the second portion of one thermoelectric element and the second portion of the second spring member engaging said second wall portion, and a thermally and electrically conductive heat transferring member extending from said second portion of the second spring member of said one junction of the pair through said second wall portion.

4. The thermocouple structure of claim 1 wherein said support means comprises a pair of junctions, one junction of said pair including an electrically and thermally conductive second spring member having resiliently connected spaced first and second portions, the first portion of the second spring member conductively engaging the second portion of one thermoelectric element and the second portion of the second spring member engaging said second wall portion, a thermally and electrically conductive heat transferring member extending from said second portion of the second spring member of said one junction of the pair through said second wall portion, the other junction of said pair including an electrically and thermally conductive third spring member having resiliently connected spaced first and second portions, the first portion of the third spring member conductively engaging the second portion of the other thermoelectric element and the second portion of the third spring member engaging said second wall portion, and a thermally and electrically conductive heat transferring member extending from said second portion of the third spring member through said second wall portion.

5. The thermocouple structure of claim 1 wherein an anti-oxidizing means is provided in said enclosure.

6. In a thermocouple structure, the combination comprising: a pair of laterally spaced dissimilar thermoelectric elements; an electrically and thermally conductive spring member having a first portion conductively engaging each of said elements, a second fixed portion and a resilient connecting portion yieldably spacing said first portion from said second portion; and a thermally conductive member fixed to said second portion of the spring member for transferring heat selectively to and from said elements through said spring member.

7. A thermocouple structure, comprising: a plurality of pairs of dissimilar thermoelectric elements; and means electrically connecting said elements in series to provide hot junctions on one side and cold junctions on the other side when the elements are subjected to a direct current, said junctions each including a resilient expandable metal member of generally U-shaped cross section having one leg attached to an element and the other leg spaced therefrom; a substantially air tight container surrounding said elements and said members, the interior of said container being subjected to a substantially non-oxidizing atmosphere, and a thermal conducting member extending from each of said other legs to the exterior of said container.

References Cited in the file of this patent

UNITED STATES PATENTS

| | | |
|---|---|---|
| 1,848,655 | Petrik | Mar. 8, 1932 |
| 2,844,638 | Lindenblad | July 22, 1958 |
| 2,886,618 | Goldsmid | May 12, 1959 |
| 2,903,857 | Lindenblad | Sept. 15, 1959 |

FOREIGN PATENTS

| | | |
|---|---|---|
| 775,969 | Great Britain | May 29, 1957 |
| 23,227 | Austria | Feb. 26, 1906 |